United States Patent [19]
Snyder

[11] Patent Number: 5,839,890
[45] Date of Patent: Nov. 24, 1998

[54] CONDENSATION FREE NOZZLE

[75] Inventor: William Joseph Snyder, Ossining, N.Y.

[73] Assignee: Praxair Technology, Inc., Danbury, Conn.

[21] Appl. No.: 715,721

[22] Filed: Sep. 19, 1996

[51] Int. Cl.[6] .................................................. F23C 5/00
[52] U.S. Cl. ........................ 431/8; 431/349; 431/187; 239/DIG. 19; 239/553
[58] Field of Search ................................ 431/349, 187, 431/8; 239/DIG. 19, 553, 558

[56] References Cited

U.S. PATENT DOCUMENTS

| | | | |
|---|---|---|---|
| 1,865,905 | 7/1932 | Hummon | 431/349 |
| 1,938,852 | 12/1933 | Mckee | 431/349 |
| 1,943,859 | 1/1934 | Fisher | 431/349 |
| 1,978,477 | 10/1934 | Robertson | 431/349 |
| 2,237,889 | 4/1941 | Rickert | 431/349 |
| 4,165,364 | 8/1979 | Dollinger et al. | 431/8 |
| 5,110,285 | 5/1992 | Snyder et al. | 431/8 |
| 5,209,656 | 5/1993 | Kobayashi et al. | 431/187 |
| 5,266,024 | 11/1993 | Anderson | 431/11 |
| 5,266,025 | 11/1993 | Francis, Jr. et al. | 431/187 |
| 5,295,816 | 3/1994 | Kobayashi et al. | 431/9 |
| 5,302,112 | 4/1994 | Nabors, Jr. et al. | 431/8 |
| 5,449,286 | 9/1995 | Snyder et al. | 431/9 |

*Primary Examiner*—Carroll B. Dority
*Attorney, Agent, or Firm*—Stanley Ktorides

[57] ABSTRACT

A nozzle which includes a nozzle body, a central tube contained within the nozzle body for a flow of gas at a temperature less than the temperature of the nozzle body, and an annular passage, located between the nozzle body and central tube, for a flow of gas at a velocity less than the flow of gas in the central tube and less than about 100 ft/sec. enabling the nozzle to operate at elevated temperatures and avoid condensation thereon of vapors from the surrounding gas environment.

8 Claims, 2 Drawing Sheets

CONDENSATION FREE NOZZLE

FIELD OF THE INVENTION

The present invention relates generally to nozzles, more particularly to nozzles useful for the injection of gases into a combustion zone.

BACKGROUND ART

Advances in combustion technology have employed the use of high velocity gas injection into a combustion zone to carry out combustion with reduced nitrogen oxides ($NO_x$) generation. Nozzles with relatively small diameters are employed in order to achieve the high velocities. The high gas velocities cause furnace gases to be aspirated or entrained into the high velocity gas which has a dampening effect on $NO_x$ generation.

A problem with high velocity gas injection into a combustion zone is that the furnace gases, which may comprise particulate matter and condensable vapors, cause the nozzles, which have small openings to begin with, to foul, plug or corrode easily as the furnace gases are aspirated or entrained into the high velocity gas exiting the nozzle. The furnace gases also tend to be quite hot, on the order of 1000° F., or more, which exacerbates the fouling and corrosion problem. This problem becomes particularly severe when the furnace temperature exceeds 2200° F. The maximum service temperatures of common high temperature alloys are generally less than 2200° F., for fuel-fired furnace atmospheres. Some noble metals such as platinum can withstand higher temperatures, but the cost becomes excessive.

One way of dealing with this problem has been to provide a large amount of water cooling to the nozzle so as to prevent high temperature corrosion or melting. However, a water cooling system is complex to operate, costly, and does not address the fouling problem where the furnace atmosphere has a high particulate content. Moreover, water cooling can escalate the corrosion and fouling problems when the furnace atmosphere contains condensable vapors.

Ceramic lances have been proposed as a solution to the fouling problem in high velocity gas injection. However, presently available ceramic lances are not suitable for industrial scale operations because of corrosion and cracking due to thermal and other stresses.

It is known that temperature effects on a nozzle may be ameliorated by recessing the nozzle in a cavity communicating with a combustion zone. However, a relatively large recess is required to achieve a significant beneficial effect. With high velocity gas injection, such a large recess may be detrimental because a large amount of corrosive furnace gas may be drawn into the cavity. Furthermore, this results in a reduction in the gas jet velocity. Thus, while the nozzle avoids temperature induced damage, this is offset by increased damage caused by contact with corrosive furnace gas drawn into the cavity.

A recurring problem in refractory tipped oxygen or fuel injectors in glass furnaces can be the accumulation of condensed materials on the tip of the nozzle which form a narrow tube-like structure around the jet extending into the furnace. These growths, over time, can distort the jet and cause undesirable combustion conditions to exist in the furnace which, in turn, can damage the furnace refractory, cause off ratio burner operation, or upset the glass quality.

One previous approach, described in U.S. Pat. No. 5,266,025, purged the area around the nozzle with clean gas, e.g. oxygen. This usually required passing a large percentage of the gas (30%–50%) around the nozzle to prevent the furnace atmosphere from contacting the nozzle. In practice, however, because the concentricity of the nozzle within the annulus is important to achieve this protection, it is generally difficult to achieve. Also, by shifting a large percentage of gas to the annulus, the $NO_x$ performance of the burner may be compromised (i.e., high $NO_x$ can form) or higher oxygen pressure may be required to increase the velocity of the center jet.

Another previous approach involved building the nozzle from a porous material to have clean gas emanating from any surface which could possibly accumulate deposits. The design of such a nozzle, however, is fairly complicated, its life in the furnace is questionable, and it produces slightly higher $NO_x$ than a conventional refractory-tipped nozzle.

A further approach involved lengthening the refractory section of the nozzle to elevate the surface temperature of the nozzle. Also, along these lines, the existing nozzles were inserted further into the furnace resulting in higher surface temperatures on the nozzle. These techniques alleviated the problem, but did not eliminate it, or created other problems such as overheating of the metallic components of the lance.

In light of the foregoing, there is a need for a nozzle that overcomes the disadvantages of the related art.

SUMMARY OF THE INVENTION

Accordingly, the present invention is directed to a nozzle which may be employed in a high velocity gas injection system and substantially obviates one or more of the problems due to the limitations and disadvantages of the related art.

An additional object of the present invention is to prevent condensation on nozzle surfaces, for instance by preventing cold nozzle surfaces from occurring instead of altering the conditions around the nozzle (i.e., shrouding, purging, etc.).

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

To achieve these and other advantages and in accordance with the purpose of the present invention, as embodied and broadly described herein, the nozzle of the present invention has a nozzle body, a central tube, and an annular passage. The central tube is contained within the nozzle body and is for a flow of a gas. The annular passage, located between the nozzle body and the central tube, is substantially flush with the end of the central tube, and is also for a flow of a gas. The velocity of the gas flowing through this passage is less than the velocity of the gas flowing through the central tube and is less than about 100 ft/sec. The wall thickness of the central tube is less than or equal to the radial width of the annular passage (i.e., gap of the annulus).

Another aspect of the present invention is a gas injection system comprising a cavity within a wall of a combustion zone and having an opening communicating with the combustion zone and the above-described nozzle in the cavity.

An additional aspect of the present invention is a nozzle for injecting gas into a combustion chamber. The nozzle has an annular body having a central bore with an inlet end and an outlet end. The nozzle also has a tubular member positioned in the central bore for receiving a first gas at the inlet end and ejecting the first gas at an outlet end. The tubular member has an outer surface defining an annular passage extending between the inlet and outlet ends for passing a second gas received at the inlet end. Also, the nozzle has means for reducing the transfer of heat in the radial direction between the annular body and the first gas contained in the tubular member. The first gas and second gas can be from the same or different gas sources.

A further aspect of the present invention is a method of minimizing or preventing condensation on a nozzle surface of a nozzle used for injecting gas into a combustion chamber. The method includes passing a first gas at a first rate of flow through a tubular member located within a nozzle body and forming an annular passage, and passing a second gas at a second flow rate through the annular passage that is substantially flush with the end of the tubular member. The second rate of flow of the second gas is substantially less than the first rate of flow and less than about 100 ft/sec. The tubular member has a thickness less than or equal to the radial width of the annular passage, and along with the second rate of flow, impedes the transfer of heat between the nozzle and the gas at the first flow rate.

It is to be understood that both the foregoing general description and the following detailed description are exemplary and explanatory only and are intended to provide further explanation of the present invention, as claimed.

The accompanying drawings, which are incorporated in and constitute a part of this specification, illustrate several embodiments of the present invention and together with the description, serve to explain the principles of the present invention.

DETAILED DESCRIPTION

As used herein, the term "nozzle" means a device through which either gaseous oxidant or gaseous combustible matter or a premixed mixture of oxidant and fuel is injected into a cavity or a combustion zone.

As used herein, the term "ceramic" means a non-metallic material which can withstand a temperature greater than 2200° F. Ceramics typically are refractory materials comprising oxides, carbides, or nitrides.

The present invention minimizes or prevents condensation on a surface of a nozzle, for instance, used for injecting gas into a combustion chamber. This is primarily accomplished by passing a first gas at a first rate of flow through a tubular member located within a nozzle body and forming an annular passage, and also passing a second gas at a second rate of flow through the annular passage. The tubular member has a thickness less than or equal to the radial width of the annular passage. The second gas through the annular passage is at a second rate of flow substantially less than the first rate of flow and less than about 100 ft/sec. This difference in flow rate impedes the transfer of heat in the radial direction. Or, in other words, it impedes the transfer of heat between the nozzle and the gas at the first flow rate. The first and second gas can be from the same or different gas source.

Figure 1:
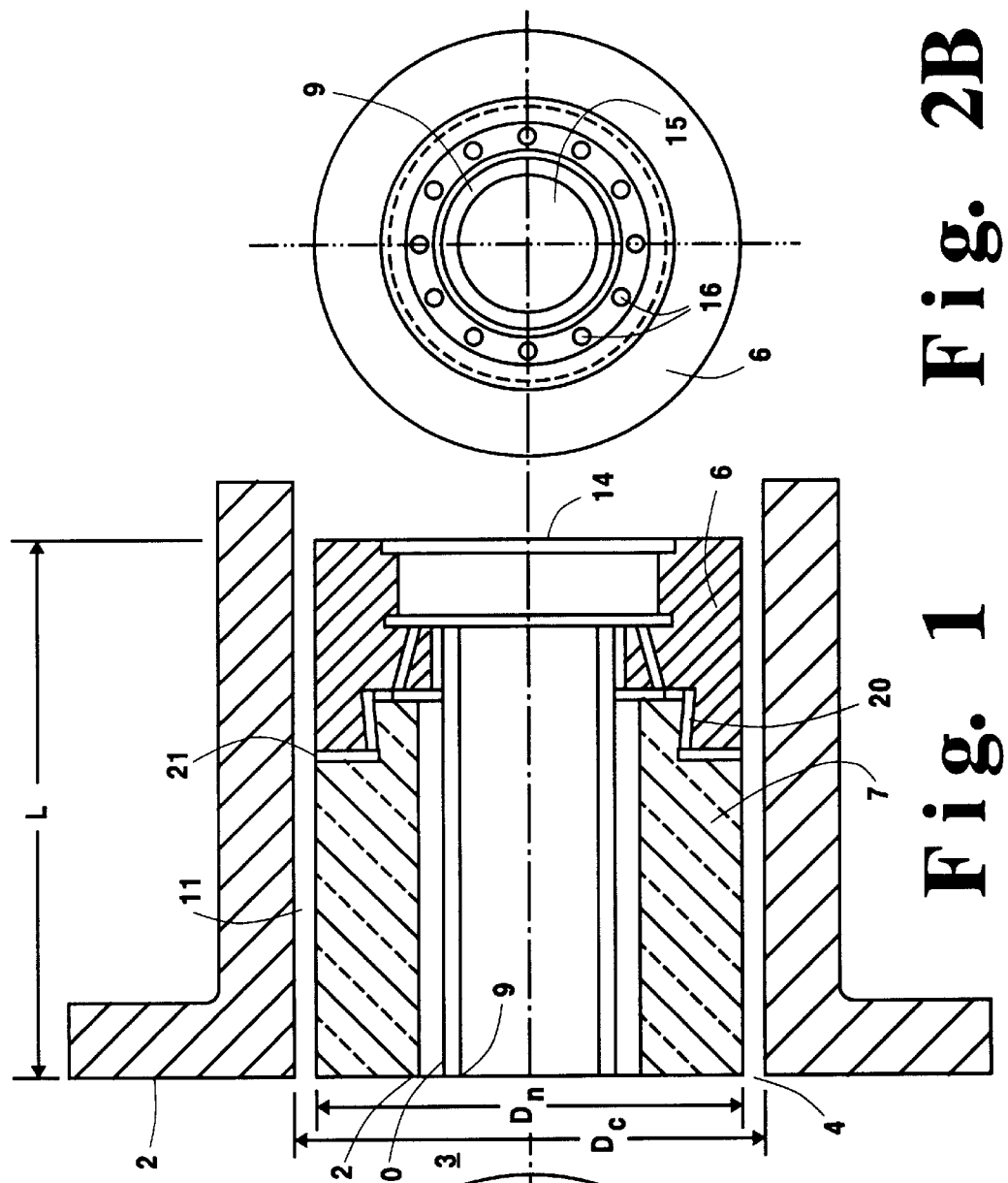
FIG. 1 is a view partly in cross-section of a preferred embodiment of the nozzle and gas injection system of the present invention.
Figures 2A, 2B:
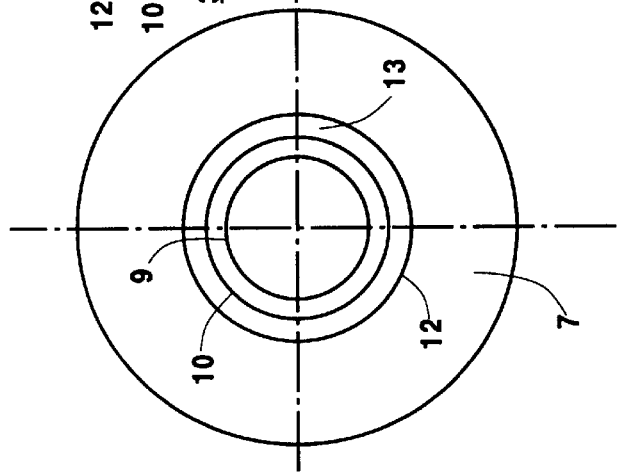
FIG. 2A is a view of the exit end of the nozzle and gas injection system of FIG. 1.
FIG. 2B is a view of the inlet end of the nozzle and gas injection system of FIG. 1.

Referring to FIGS. 1, 2A and 2B, refractory wall 2 borders combustion zone 3 wherein there is contained a furnace atmosphere comprising furnace gases such as, for example, carbon dioxide, water vapor, nitrogen and/or oxygen. The furnace atmosphere is generally at an elevated temperature typically exceeding 2000° F., and usually within the range of from 2000° to 3500° F. The furnace atmosphere may also contain particulate matter, such as glass batch materials or ash from coal combustion, and/or condensable vapors such as sodium species or acid vapors.

Within refractory wall 2 there is provided cavity 11 which communicates with combustion zone 3 at opening 4. Generally, opening 4 will have a diameter, denominated in FIG. 1 as $D_c$, within the range of from 1.0 to 10 inches.

In accordance with the present invention, the nozzle for injecting a gas has an annular body. This annular body has a central bore having an inlet end and an outlet end. A tubular member 9 is positioned in the central bore and has an outer surface 10 defining an annular passage 13 (i.e., annulus). This annular passage 13 extends between the inlet and outlet ends and is substantially flush with the outlet end of the annular body and the tubular member 9. The nozzle also contains means for reducing the transfer of heat in the radial direction between the annular body and the gas contained in the tubular member. The presence of the low velocity gas in the annular passage limits the heat transfer.

In more detail, the nozzle has a nozzle body 6, 7 that contains a central tube 9 and an annular passage 13 (i.e., an annular body having a central bore and a tubular member, having an outer surface defining an annular passage, positioned in the central bore). The central tube 9 is for a flow of a gas. The temperature of the gas flowing through the central tube 9 is less than the temperature of the nozzle body.

Further, the annular passage 13 (i.e., annulus) is located between the nozzle body 6, 7 and the central tube 9. The annular passage 13 is for a flow of gas having a velocity less than the velocity of the gas flowing through the central tube and has a velocity less than about 100 ft/sec.

The nozzle body 6, 7 can be fabricated from any material commonly used in combustion technology which is able to withstand elevated temperatures, which typically exceed 2000° F. Preferably the nozzle body is a composite piece. The nozzle body can have a 1½" inner diameter and an outer diameter of 2⅞".

Preferably, the nozzle body is constructed of a heavy nozzle wall. The thickness of the nozzle body from a point beginning at the outer edge of the annular passage to the edge of the nozzle body is preferably about 1/21" to about 1½", more preferably from about ¾" to about 1". This preferred heavier nozzle wall protects the central tube from damage by impact during the insertion or removal of the nozzle in a furnace. The heavier nozzle wall also reduces the susceptibility to thermal shock.

Furthermore, any adjustments necessary to the nozzle can be made without any fear of damage to the parts of the nozzle.

The nozzle body preferably has a back piece and a front piece and has an axial length denominated in FIG. 1 by L. The $L/D_n$ can be from 0.75 to 2.5, wherein $D_n$ is the diameter of the nozzle body. Back piece 6 can comprise from about 10 to about 60% of the nozzle axial length and front piece 7 comprises from about 40 to about 90% of the nozzle axial length measured on the outer side of the nozzle body. Preferably, the nozzle will have an axial length within the range of from 0.5 to 2 times the diameter of opening 4. Generally, this will result in a nozzle having an axial length within the range of from 1 to 5 inches. Also, the opening in the cavity is usually minimized so that $D_c = D_n + 0.25"$.

Back piece 6 preferably comprises a metal such as stainless steel, cast iron, other steels and other high temperature alloys having maximum surface temperatures, preferably within the range of from 1500° F. to about 2200° F. Other suitable materials can be used.

Front piece 7 preferably comprises a ceramic such as refractory materials comprising alumina, silica, zirconium, magnesium, or silicon carbide. The preferred ceramic material for glass furnace applications is alumina-zirconia-silicate refractory.

The maximum surface temperatures of ceramics are typically between 2000° F. and 4000° F. A ceramic material normally used for the hot side of a furnace wall will generally be useful in the practice of this invention.

The central tube (or tubular member) 9 can be made of the same material as the front piece of the nozzle body, but is preferably a ceramic tube. As an example, the ceramic tube can have an inner diameter of 1" and an outer diameter of 1¼". Preferably, besides being a ceramic tube, the central tube is a thin walled tube. The thickness of the central tube is less than or equal to the radial width of the annular passage or gap. Generally, the thickness of the ceramic tube wall is preferably from about ¹⁄₁₆" to about ⅜", more preferably from about ⅛" to about ³⁄₁₆". The material of the central tube can be any high temperature refractory material that is compatible with the temperature levels in a furnace and the gases being injected into a furnace. A preferred material is an alumina tube. Other materials that can be used for the central tube include, but are not limited to, mullite, quartz, silicon carbide, or molybdenum disilicide.

Typically, the length of the central tube is from about 1.5 d to about 4 d, more preferably from about 1.5 d to about 1.6 d, wherein d is the inner diameter of the central tube. This preferred length minimizes the pressure drop of the gas emanating from the nozzle and entering the combustion zone.

The difference between the outer diameter of the central tube 9 and the inner diameter at 12 of the nozzle body opening generally forming the nozzle body defines twice the radial width of the annular passage or the annulus gap 13. Preferably, this gap is less than ⅜"; more preferably from about ⅛" to about ⅜", most preferably is about ⅛" in thickness. When a gas enters the central tube and annular passage, the central tube's diameter preferably permits the flow of gas at a volume greater than the volume of gas flowing through the annular passage.

Though not necessary, generally the gas entering the central tube and the gas entering the annular passage are from the same gas source or supply. Generally, this gas-supply may be an oxidant such as oxygen, oxygen-enriched air, or technically pure oxygen, or may be fuel which is any gas which contains combustibles and which may combust in the combustion zone, or may be a premixture of oxidants and fuel. Such fuels include, but are not limited to, natural gas, vaporized liquid fuel, coke oven gas, propane, hydrogen, and methane.

The present invention will find particular utility with high velocity gases wherein the gas is ejected out the central tube and annular passage wherein the velocity of the gas exiting the central tube preferably exceeds about 150 feet per second and can reach velocities up to 1000 feet per second or more. More preferably, the velocity of the gas exiting the central tube is from about 185 feet/second to about 400 feet/second. The velocity of the gas exiting the annular passage is typically from about 10 feet/second to about 50 feet/second.

In general, the majority of the gas supplied to the nozzle enters the central tube and the remaining amount of gas enters the annular passage. Preferably, from about 80% by volume to about 95% by volume of the gas entering the nozzle from the gas source enters the central tube, more preferably about 90% by volume of the gas enters the central tube while the remaining amount, preferably about 10% by volume, enters the annular passage from the gas source.

Figure 3:
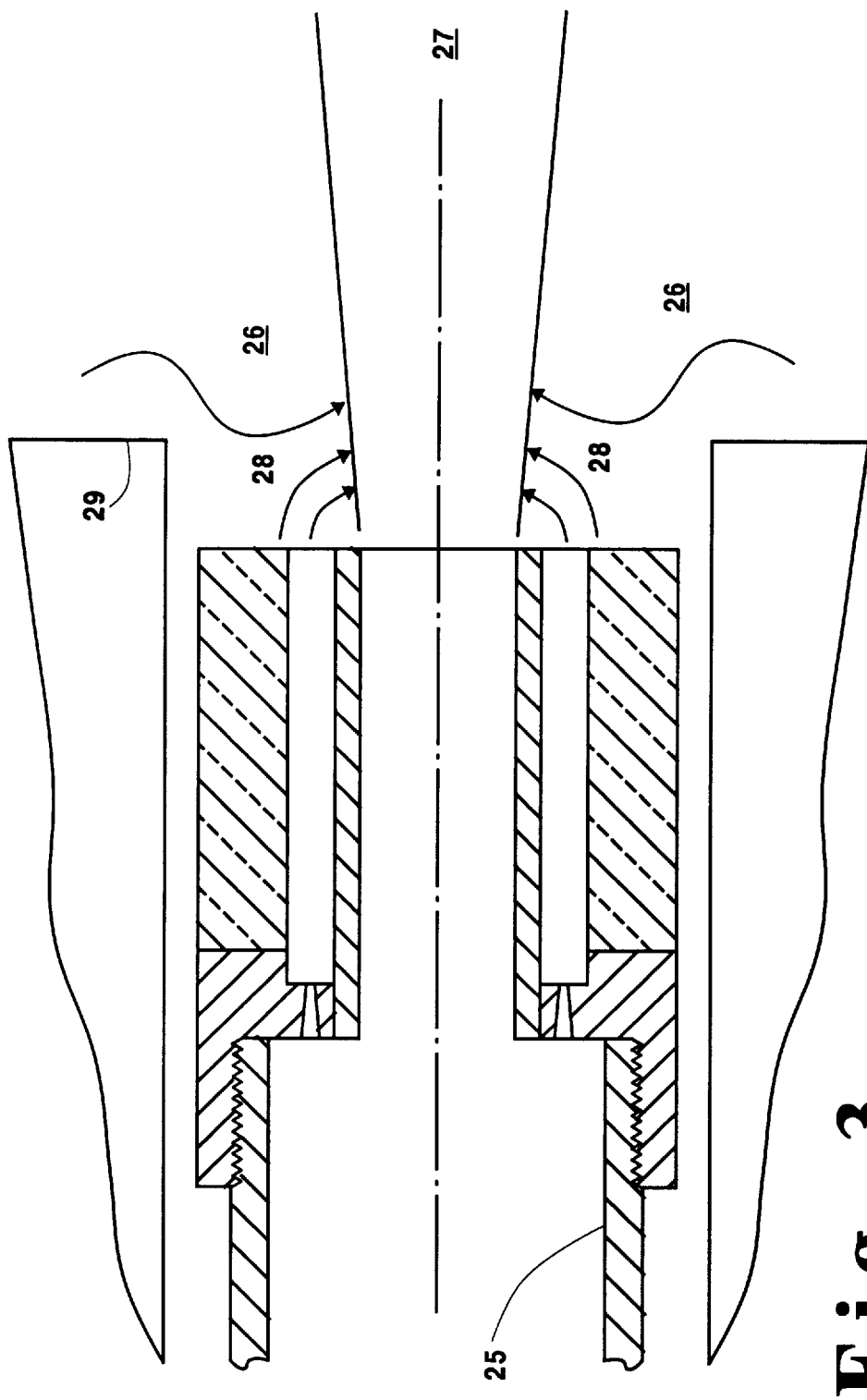
FIG. 3 is another view partly in cross-section of another preferred embodiment of the nozzle and gas injection system of the present invention.

Back piece 6 communicates with a gas supply tube (shown in FIG. 3 as 25). In particular, the annular passage and central tube communicate with an inlet section 14. As shown in FIG. 2B, this inlet section has a central opening 15 and a plurality of openings 16 surrounding the central opening 15. The central opening communicates with the central tube and the plurality of openings communicates with the annular passage. Generally, the plurality of openings is from about 4 to about 24 equally spaced openings, each having a diameter such that the total cross-sectional area of all the openings is from about 5 to 15 percent, preferably about 10% of the total area of the openings plus the central tube opening. The plurality of openings enable the attainment of the requisite low velocity, especially from the same gas source as that of the central tube fluid, which cannot be attained with a conventional thin annular opening while still maintaining the defined low relative gas flow.

Generally, the annular passage has a length sufficient so that the velocity of the gas entering from the inlet section through the plurality of openings obtains a substantial uniform velocity in the annular passage prior to exiting the passage and entering the combustion zone. Preferably, the length of the annular passage is from about 1" to about 3".

As shown in FIG. 1, the inlet section 14 also communicates with the inner diameter of the back piece 6. Preferably, the inlet section 14 is comprised of a pipe and is attached to the nozzle body as shown in FIG. 1 by welding, brazing, or threading. Back piece 6 to front piece 7 can be adjoined by means of a reverse taper joint. Fiber ceramic gaskets 21 are used against the back piece and front piece to allow the front piece room to expand into the reverse taper joint. A reverse taper joint-gap 20 is filled with refractory ceramic cement similar to the way brick mortar fills the gap between two bricks. Small holes can be used to deliver refractory ceramic cement to joint-gap 20 which is circumferential. Other means of adjoining the front piece to the back piece include mechanical locking.

Referring to FIG. 3, the annular flow 28 provides a shielding between the central tube which may be cold and the furnace gases 26 in addition to its heat transfer effects. These effects are especially seen when the central tube is of a thin walled construction since thin walls do not require as much gas to blanket their edges and hence can tolerate being slightly eccentric in the hole. Also, due to the entrainment of gas 26 into gas jet 27 exiting the central tube, gas 28 flowing through the annulus, being of low momentum, will be preferentially pulled into jet 27 thus ensuring adequate blanketing of the central tube. Preferably, the nozzle of the present invention is either flush with the internal wall of the furnace 29 or slightly recessed (i.e., recessed about ½D, where D is the diameter of the opening of the cavity in the furnace wall). However, if recessed in a cavity, other surfaces in the cavity may be low enough in temperature to nucleate condensation. Thus, if the nozzle of the present invention is recessed, bulk cavity purging techniques could be required especially if the nozzle is significantly recessed in the cavity.

Preferably, the flow of the gas through the central tube and the flow of the gas through the annular passage are essentially parallel, i.e. coaxial. However, it is within the bounds of the present invention to configure the nozzle such that the flow of the gas through the annular passage converges into the flow of the gas through the central tube.

The subject invention uses the annular flow to minimize the heat transfer between the cold gas flowing through the nozzle and the nozzle itself. This results in elevated nozzle temperatures and hence no condensation onto the nozzle. Although extending the length of the nozzle also creates elevated nozzle temperatures, it only addresses the axial flow of heat and not the more important radial flow of heat from the nozzle inside diameter to the cold jet. The fact that the deposits on the nozzle form as long tubes attached at the nozzle exit shows that the surface adjacent to the gas flow is the coldest section and the nucleation point of the condensation.

The present invention minimizes the heat transfer from the hole or orifice from which the gas is exiting. Heat transfer analysis provides an example of the potential effectiveness of the present invention. The convective heat transfer coefficient in a pipe is a function of velocity of the gas. Keeping all other parameters constant, changing the velocity of the gas by a factor of 5, from 250 feet/second to 50 feet/second, would drop the convective heat transfer coefficient by 3.62. Using a heat balance equation in which the heat radiated from the furnace to the nozzle equals what is convected away by the flowing gas, the change in nozzle temperature resulting from this invention can be approximated:

$$Q\text{rad}=Q\text{conv}===>A\delta(T^4_{furn}-T^4_{nozz})=hA(T_{nozz}-T_{gas})$$

After combining constants, the two equations become:

$$Co(T^4_{furn}-T^4_{nozz})=h(T_{nozz}-T_{gas})$$

wherein $T_{furn}$ is the temperature in the furnace; $T_{nozz}$ is the temperature of the nozzle adjacent the furnace; and $T_{gas}$ is the temperature of the gas flowing through the nozzle, h is the convective heat transfer coefficient, and Co is a constant.

By selecting initial conditions of temperature and heat transfer coefficient, the constant Co can be determined (e.g., at $T_{furn}$=2800° F., $T_{gas}$=80° F. and $T_{nozz}$=1200° F., and h=3.62 the constant Co becomes $4\times10^{-11}$). By changing the heat transfer coefficient to 1 (equivalent to reducing the velocity by a factor of 5), a new nozzle temperature ($T_{nozz}$) is calculated as 2274° F. This calculation demonstrates the utility of the present invention by showing the magnitude of the achievable temperature difference with the nozzle of the present invention.

Another factor contributing to the success of the present invention is the small volume of gas flowing through the annular passage that has a small heat capacity. Thus, this gas in the annular passage increases in temperature more readily than the larger volume of gas in the central tube. This warmer gas in the annular passage again minimizes the heat transfer from the wall of the nozzle body to the gas by decreasing the temperature difference between adjacent materials.

The present invention will be further clarified by the following examples, which are intended to be purely exemplary of the invention.

A gas injection system was constructed using nozzles of the present invention using the preferred embodiments described earlier and illustrated in FIG. 1. In particular, the nozzle comprised a central refractory tube which carried 90% of the oxygen generally at a high velocity of about 250–400 ft/sec. The tube was located within the refractory tip nozzle such that an annulus was formed between the refractory central tube and the nozzle body. The remaining ten percent of the oxygen was passed through this cavity at a velocity of about 10–50 ft/sec. The flow split between the two cavities was achieved by the difference in area between the inlet sections of the two passages. The annular passage, supplied by 12 holes, had enough length to ensure that velocity in that passage was uniform when it reached the exit of the passage. The ceramic tube had an outer diameter of 1¼" and an inner diameter of 1" and was placed in a 1½" diameter ceramic nozzle. This produced a ⅛" annulus gap. The outer diameter of the nozzle was 2⅞". When operated at 4230 scfh, the velocity of the main jet was 194 ft/sec and that of the annulus was 31 ft/sec. After six weeks of combustion being carried out within the combustion zone of an operating glass furnace, no fouling of the nozzle occurred.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A nozzle for injecting gas into a combustion chamber, comprising:

an annular body having a central bore with an inlet end and an outlet end, a ceramic tubular member positioned in the central bore for receiving a first gas stream at the inlet end and discharging the first gas stream at an outlet end, said tubular member having an outer surface defining an annular passage between the annular body and the tubular member, said annular passage having a radial width extending between the inlet end and outlet end for passing a second gas stream received at the inlet end, wherein said tubular member has a wall thickness less than or equal to the radial width of the annular passage;

means connecting said central bore and said annular passage to a common source of gas, means for discharging a flow of gas from said annular passage at a velocity substantially less than that discharged from said central core for reducing the transfer of heat between the annular body and the gas contained in the tubular member.

2. A nozzle comprising:

an annular nozzle body;

a ceramic central tube, contained within said nozzle body, for flowing gas; and an annular passage, located between said nozzle body and said central tube and said annular nozzle body being substantially flush with the end of the central tube said annular passage and said central tube being connected to a common gas source, and means associated with said annular passage for flowing gas at a velocity less than the velocity of gas in said central tube and less than about 100 ft/sec, said central tube having a wall thickness less than or equal to the radial width of the annular passage.

3. The nozzle of claim 2, wherein said means associated with said annular passage includes an inlet section having a central opening and a plurality of openings surrounding said central opening, and wherein said central opening communicates with said central tube and said plurality of openings communicates with said annular passage.

4. The nozzle of claim 3, wherein said plurality of openings is from about 4 to about 24 equally spaced openings having a total area of from about 5 to 15 percent of the total area of said central opening plus said equally spaced openings.

5. A method for preventing condensation on a surface of a nozzle used for injecting gas into a combustion chamber, comprising:

passing from a common gas source gas at a first rate of flow through a ceramic tubular member located within an annular nozzle body;

passing gas through an annular passage having a radial width, located between said nozzle body and tubular member, said annular body terminating substantially flush with the end of the tubular member, at a second rate of flow less than the first rate of flow and less than about 100 ft/sec to impede the transfer of heat between the nozzle and the gas at the first rate of flow, wherein said tubular member has a thickness less than or equal to the radial width of the annular passage.

6. The method of claim 5, wherein from about 80% by volume to about 95% by volume of gas from said common gas source enters said tubular member and the remaining volume of gas from said gas source enters said annular passage.

7. The method of claim 5, wherein said second rate of flow in said annular passage is from about 10 ft/second to about 50 ft/second.

8. The method of claim 5, wherein said first rate of flow in said tubular member has a velocity of from about 185 ft/second to about 400 ft/second and said second rate of flow in said annular passage has a velocity of from about 10 ft/second to about 50 ft/second.

\* \* \* \* \*